United States Patent
Kohli et al.

(10) Patent No.: US 11,966,703 B2
(45) Date of Patent: *Apr. 23, 2024

(54) GENERATING REPLACEMENT SENTENCES FOR A PARTICULAR SENTIMENT

(71) Applicant: INTUIT INC., Mountain View, CA (US)

(72) Inventors: Manav Kohli, San Francisco, CA (US); Cynthia Joann Osmon, Sunnyvale, CA (US); Nicholas Roberts, Fresno, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/065,716

(22) Filed: Dec. 14, 2022

(65) Prior Publication Data

US 2023/0117094 A1 Apr. 20, 2023

Related U.S. Application Data

(63) Continuation of application No. 17/495,681, filed on Oct. 6, 2021, now Pat. No. 11,551,010, which is a (Continued)

(51) Int. Cl.
*G06F 40/30* (2020.01)
*G06F 40/284* (2020.01)
*G06N 20/00* (2019.01)

(52) U.S. Cl.
CPC ............ *G06F 40/30* (2020.01); *G06F 40/284* (2020.01); *G06N 20/00* (2019.01)

(58) Field of Classification Search
CPC ....... G06F 40/30; G06F 40/284; G06N 20/00; G06N 3/044; G06N 3/045; G06N 5/041; G06N 3/08
See application file for complete search history.

(56) References Cited

U.S. PATENT DOCUMENTS 8,037,086 B1 * 10/2011 Upstill ................. G06F 16/374
704/10
9,812,151 B1 11/2017 Amini et al.
(Continued)

OTHER PUBLICATIONS

Guu, Kelvin, Tatsunori B. Hashimoto, Yonatan Oren, and Percy Liang. "Generating sentences by editing prototypes." arXiv preprint arXiv:1709.08878 (2017), 14 pages.
(Continued)

*Primary Examiner* — Bhavesh M Mehta
*Assistant Examiner* — Darioush Agahi
(74) *Attorney, Agent, or Firm* — Patterson + Sheridan, LLP (57) ABSTRACT

Certain aspects of the present disclosure provide techniques for generating a replacement sentence with the same or similar meaning but a different sentiment than an input sentence. The method generally includes receiving a request for a replacement sentence and iteratively determining a next word of the replacement sentence word-by-word based on an input sentence. Iteratively determining the next word generally includes evaluating a set of words of the input sentence using a language model configured to output candidate sentences and evaluating the candidate sentences using a sentiment model configured to output sentiment scores for the candidates sentences. Iteratively determining the next word further includes calculating convex combinations for the candidate sentences and selecting an ending word of one of the candidate sentences as the next word of the replacement sentence. The method further includes transmitting the replacement sentence in response to the request for the replacement sentence.

20 Claims, 6 Drawing Sheets

Related U.S. Application Data continuation of application No. 16/459,199, filed on Jul. 1, 2019, now Pat. No. 11,170,175.

(56) References Cited

U.S. PATENT DOCUMENTS

| | | | |
|---|---|---|---|
| 9,875,258 B1 | 1/2018 | Hsiao et al. | |
| 10,778,705 B1* | 9/2020 | Park | G06F 11/327 |
| 2015/0242391 A1 | 8/2015 | Goel et al. | |
| 2016/0062969 A1* | 3/2016 | Mengle | G06F 40/30 |
| | | | 704/9 |
| 2016/0283588 A1* | 9/2016 | Katae | G06F 16/345 |
| 2017/0140755 A1* | 5/2017 | Andreas | G06F 40/35 |
| 2017/0147919 A1 | 5/2017 | Lee et al. | |
| 2019/0130289 A1 | 5/2019 | Giovannini et al. | |
| 2020/0012697 A1 | 1/2020 | Fan et al. | |
| 2020/0073947 A1 | 3/2020 | Bertoldi et al. | |
| 2020/0110836 A1 | 4/2020 | Kumbhar et al. | |
| 2020/0218781 A1* | 7/2020 | Takano | G06Q 30/016 |
| 2020/0250139 A1* | 8/2020 | Muffat | G06V 30/1988 |
| 2020/0335096 A1* | 10/2020 | Li | G06N 3/04 |
| 2021/0365643 A1 | 11/2021 | Agrawal et al. | |

OTHER PUBLICATIONS

Hu, Zhiting, Zichao Yang, Xiaodan Liang, Ruslan Salakhutdinov, and Eric P. Xing. "Toward controlled generation of text." arXiv preprint arXiv:1703.00955 (2018), 10 pages.

Jozefowicz, Rafal, Oriol Vinyals, Mike Schuster, Noam Shazeer, and Yonghui Wu. "Exploring the limits of language modeling." arXiv preprint arXiv:1602.02410 (2016), 11 pages.

Larsson, Maria, Amanda Nilsson, and Mikael Kågebäck. "Disentangled representations for manipulation of sentiment in text." arXiv preprint arXiv:1712.10066 (2017), 6 pages.

Radford, Alec, Rafal Jozefowicz, and Ilya Sutskever. "Learning to generate reviews and discovering sentiment." arXiv preprint arXiv:1704.01444 (2017), 9 pages.

Sindhwani, Vikas, and Prem Melville. "Document-word co-regularization for semi-supervised sentiment analysis." In Data Mining, 2008. ICDM'08. Eighth IEEE International Conference on, pp. 1025-1030. IEEE, 2008, 6 pages.

* cited by examiner

GENERATING REPLACEMENT SENTENCES FOR A PARTICULAR SENTIMENT

CROSS-REFERENCE TO RELATED APPLICATIONS

This Application is a continuation of and hereby claims priority under 35 U.S.C. § 120 to co-pending U.S. patent application Ser. No. 17/495,681, filed on Oct. 6, 2021, which is a continuation of U.S. patent application Ser. No. 16/459,199, filed on Jul. 1, 2019, now U.S. Pat. No. 11,170,175, the entire contents of each of which are incorporated herein by reference.

INTRODUCTION

Aspects of the present disclosure relate to generation of sentences using machine learning techniques.

An important aspect of maintaining software applications for computing devices (or other types of services) is to provide customer support (such as technical help) to users. In addition to material such as help guides or frequency asked questions (FAQ) documents, support agents and various automated tools may be provided to assist users in real time. In order to improve user retention of the information and user satisfaction with the assistance, and possibly the service as a whole, such real time assistance should be accurate and should also convey a proper sentiment. However, no tools currently exist to automatically rephrase a sentence to retain meaning but change sentiment to match a specified sentiment, and this is a difficult task even for experienced human support agents. Thus, systems and methods are needed to generate replacement sentences for a given sentence to match a particular sentiment while substantially retaining the meaning of the sentence.

BRIEF SUMMARY

Certain embodiments provide a method for generating a replacement sentence with the same or similar meaning but a different sentiment than an input sentence. The method generally includes receiving a request for a replacement sentence based on an input sentence and iteratively determining a next word of the replacement sentence word-by-word based on the input sentence. Iteratively determining the next word generally includes evaluating a set of words of the input sentence using a language model configured to output candidate sentences based on a probability of word appearance following the set of words of the input sentence, the candidate sentences comprising the set of words appended with an ending word and evaluating the candidate sentences using a sentiment model configured to output sentiment scores for the candidates sentences based on a sentiment of the candidate sentences. Iteratively determining the next word further includes calculating convex combinations for the candidate sentences using the sentiment scores for the candidate sentences and the probability of word appearance of the candidate sentences and selecting, based on the convex combinations, an ending word of one of the candidate sentences as the next word of the replacement sentence. The method further includes transmitting, to a chatbot server for display to a user, the replacement sentence in response to the request for the replacement sentence.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer readable mediums for generating a set of candidate sentences with the same or similar meaning but a different sentiment than an input sentence.

Real time customer assistance can be provided using tools including "chatbots" or other similar real time customer assistance systems, that use artificial intelligence (AI) and/or machine learning (ML) to determine responses to, and interaction with, a customer. Such a chatbot can provide an automated answering service that determines the best answers to questions and provide those answers to customer support agents within existing communication applications. In this way, the customer support agent need not learn to use a new system, do independent research, or otherwise depart from the customer support agent's typical workflow.

One limitation of chatbots and similar systems is the inability to provide answers of a particular sentiment while retaining the meaning of the answers. While chatbot answers may be accurate for providing technical information, the sentiment expressed in an answer is also important. The sentiment used in customer support answers can impact how customers feel and experience a product, especially when such answers may be provided for systems dealing with sensitive data. This problem affects not just automated answers such as those from chatbots, but also answers given by human agents, who may express inadvertent sentiment in customer support answers.

Systems and methods to enable changing the sentiment of a sentence while retaining meaning are described herein. In particular, the systems and methods herein involve a machine learning model that, when given a string of characters from a sentence as input, outputs a set of words that are most likely to follow the string. Because this set of words is the most likely to follow the string, they likely represent a set of alternative words that express the same meaning but may convey a different sentiment (e.g., the difference between the words "ask" and "demand."). The machine learning model can thus generate candidate sentences for replacing an input sentence by building the candidate sentences word-by-word. Then, a different machine learning model trained to analyze the in-context sentiment of sentences can be used to grade the closeness of the candidate sentences to a goal sentiment. Thus, a replacement sentence can be determined, word-by-word, by maximizing the probability of a next word and the closeness of the overall sentence including the next word.

Consider the following simplified example: a user has requested help finding a particular user interface (UI) item in an application. An initial response by a chatbot used to respond to the request for help may be: "Button x is in the bottom right." However, by using sentiment analysis, this first generated response can be determined to have neutral or slightly negative sentiment. If so, a user associated with the chatbot (such as a developer) may request a replacement sentence that retains the meaning of the initial response but that conveys a more positive sentiment than the initial response.

By using the first words of the initial response ("Button x") as input, a replacement sentence can be generated word-by-word using predictive machine learning language model and a machine learning sentiment model. The replacement sentence may be: "Button x can be found in the lower right." This replacement sentence retains the meaning of the initial response (e.g., relative location of button x) but conveys a more positive sentiment. As this sentence conveys a more positive tone this sentence may be able help the user more effectively compared to the first response. Additionally, this replacement sentence may improve the user's experience and attitude towards the provided customer help overall.

Figure 1:
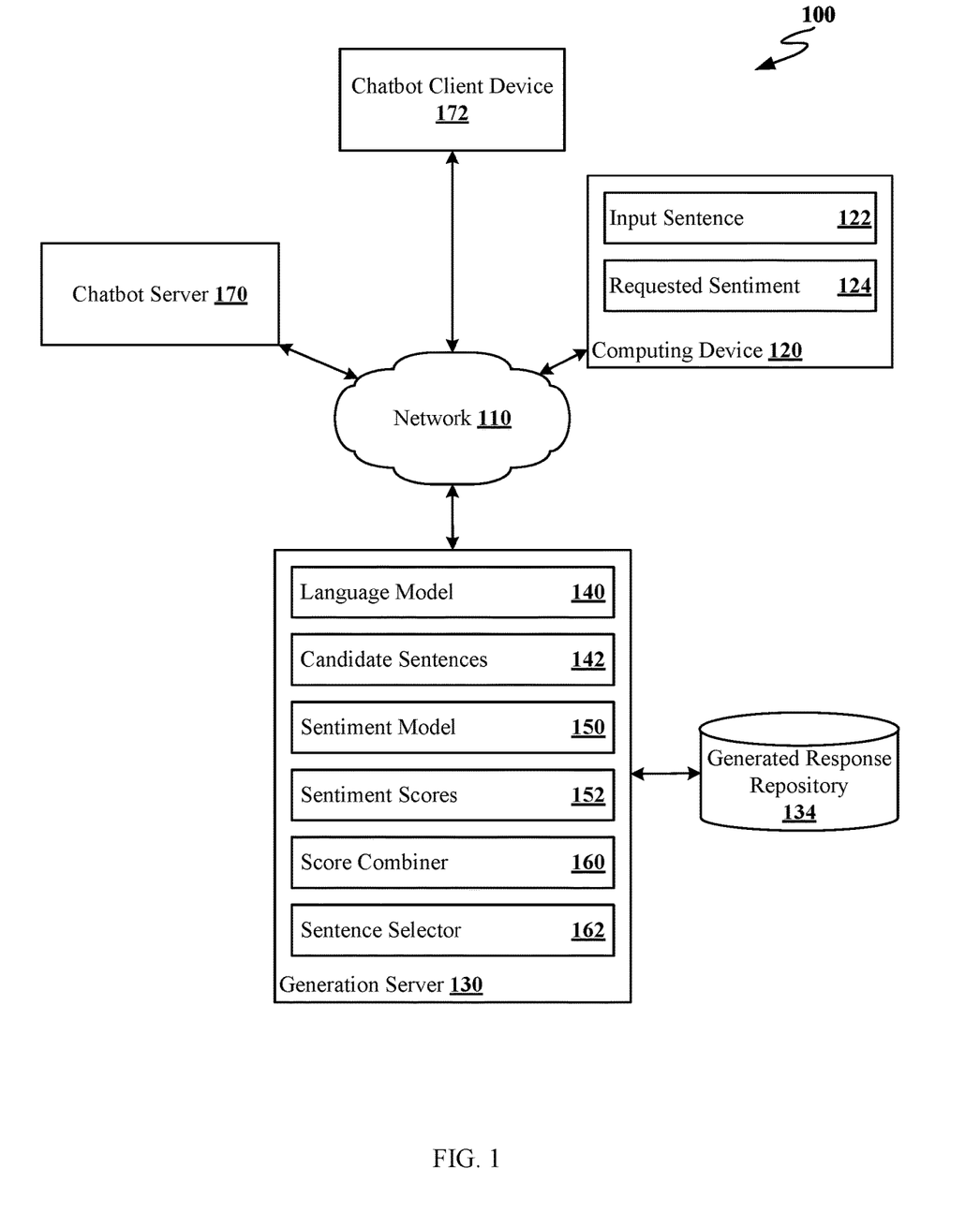
FIG. 1 depicts a computing environment for generating candidate sentences based on an input sentence and a goal sentiment, according to one embodiment.

FIG. 1 depicts a computing environment 100 for generating candidate sentences based on an input sentence and a goal sentiment. Computing environment 100 includes computing device 120, generation server 130, generated response repository 134, chatbot server 170 and chatbot client device 172, all connected via network 110.

Computing device 120 is a personal device such as a desktop computer, laptop computer or mobile device including at least a processor and a memory (not shown). In general, computing device 120 is used to initiate a request for a replacement sentence, based on a base sentence stored in memory (input sentence 122) and a sentiment that the replacement sentence should match (requested sentiment 124). In this example, computing device 120 is used by a developer working on chatbot server 170 to send replacement sentence requests to generation server 130. In other examples, computing device 120 may be used or operated by a customer support agent directly or generally by any user requesting a generated sentence to maintain the meaning but alter the sentiment of a base sentence. In still other examples, chatbot server 170 may determine autonomously, when interacting with a customer, that a particular answer conveys an inappropriate sentiment (e.g., the sentiment of the particular answer falls below a threshold for negativity express based on a sentiment analysis). In such examples, chatbot server 170 can request a replacement sentence for the particular answer with a more appropriate (e.g., more positive) sentiment, but the same meaning as the particular answer. In general, a wide array of human users or software entities may request a sentence of a particular sentiment but retaining a meaning of an original sentence from generation server 130.

Generation server 130 is a computing device including at least a processor and a memory (not shown). Generation server 130 receives replacement sentence requests (such as from computing device 120) and generates new sentences in response to such requests. Generation server 130 includes various software modules and routines such as language model 140, sentiment model 150, score combiner 160 and sentence selector 162, and stores various data elements, such as candidate sentences 142 and sentiment scores 152. Although shown as a single entity, in other examples, the functions of generation server 130 may be performed across a plurality of additional computing devices, such as in a cloud computing system or other distributed computer system.

Language model 140 is a machine learning model executing on generation server 130 to predict a next word in a sentence, based on one or more previous words. By so doing, language model 140 can generate a variety of alternative to an input sentence, which express the same meaning as the input sentence but a different sentiment. Language model 140 may be any of a variety of machine learning models suited for predictive tasks, including recurrent neural networks (RNN), long short term memory (LSTM) RNNs, bi-directional LSTM RNNs, time delay neural networks (TDNN), hidden Markov models (HMI), or others. In this example, language model 140 is a bi-directional LSTM RNN. The functions of a bi-directional LSTM RNN are described in further detail below with respect to FIG. 3. Further, in this example language model 140 may be trained on a separate computing device, such as training server 210 of FIG. 2, below, but in other examples language model 140 can be trained an executed on generation server 130.

As an example of operation, when given the first word of a sentence language model 140 predicts a second word, when given the first and second words language model 140 predicts a third word, and so on. Language model 140 can be so used to iteratively construct a sentence word-by-word, by repeatedly generating a next word based on a previously generated string or sentence fragment. Generally, language model 140 outputs a set of most likely words rather than a single most likely word, although in some examples language model 140 can produce a single word instead. If outputting a set of most likely words, each word of the set of most likely words is associated with a probability of appearance, indicating a confidence or likelihood that the word should be the next word in the sentence. Words with a high probability of appearance indicate that the word likely retains the meaning of the word in that position of the input sentence.

Language model 140 produces candidate sentences 142 as output. Candidate sentences 142 are sentences, or partial sentences, intended as a replacement for input sentence 122, meaning they retain the meaning of input sentence 122 but convey a different sentiment than input sentence 122. On a first pass, candidate sentences 142 may include as few as two words each (one base word and one generated word) but as generation server 130 continues to execute, language model 140 may continue to construct candidate sentences 142 to be arbitrarily long. In addition, using longer strings of base words may result in better retention of the meaning of the input sentence. For example, using the first ten words of the input sentence as base words may lead to a more maintained meaning than using just the first word of the input sentence. In general, language model 140 may cease generation of candidate sentences 142 when the most recent word of candidate sentences 142 is an end of sentence token (such as a period, question mark or other punctuation) or when candidate sentences 142 have exceeded a threshold value above the length of input sentence 122 (e.g., candidates sentences 142 are a certain percentage longer than input sentence 122 or include a certain number of words more than input sentence 122).

Candidate sentences 142 are analyzed by sentiment model 150 to determine the sentiment of candidate sentences 142. Sentiment model 150 is a machine learning model executing on generation server 130 to determine sentiment scores 152 for candidate sentences 142. Generally sentiment model 150 calculates an estimated "polarity" (e.g., positive or negative) of an input sentence or sentence fragment. Sentiment model 150 may use any of a variety of machine learning techniques, such as latent semantic analysis, support vector machines (SVM), the bag of words method, deep learning techniques or other methods. Sentiment model 140 may be trained on a separate computing device from generation server 130 before execution.

Sentiment model 150 takes candidates sentences 142 as input and produces sentiment scores 152 as output. In general, sentiment scores 152 are produced for each of candidate sentences 142 graded relative to requested sentiment 124. Requested sentiment 124 may be scaled from 0 (most negative) to 1 (most positive), with a score of 0.5 indicating neutrality, although other scales (such as −1 to 1 or 0 to 100) are possible. Sentiment scores 152 are a scoring of closeness to requested sentiment 124. Thus, sentiment scores 152 may be a difference from requested sentiment 124 for each of candidate sentences 142 (e.g., the absolute value of actual sentiment subtracted from requested sentiment), a relative closeness to requested sentiment 124 for each of candidate sentences 142 (e.g., a ranking of candidate sentences 142 based on closeness) or other measures of closeness from one data point to another.

Score combiner 160 is a software routine executing on generation server 130 to generate a unified selection score for each of candidate sentences 142. In general, score combiner 160 may be a function to calculate a convex combination for each of candidate sentences 142 using the probability of appearance for each candidate sentence (which serves as an approximation of closeness to meaning of the input sentence) and the sentiment score for each candidate sentence. A convex combination refers to combination of points summing to 1. In this example, score combiner 160 may weigh the probability of selection for a given word and the sentiment score for that word differently to afford more weight to one metric over the other (e.g., probability of appearance accounting for 75% of the convex combination and sentiment score accounting for 25%, or vice versa).

In some cases, alternatives to convex combinations may be used. For example, one alternative measure may be comparing the vector distance (e.g., using a distance function) between words of the base sentence and words of candidate sentences 142, to establish semantic drift between the base sentence and candidate sentences 142. Setting an upper threshold for allowable semantic drift may ensure that the base sentence and candidate sentences 142 are similar. This may allow for generating sentences that change the fewest amount of words from the base sentence.

However, when using convex combinations, after score combiner 160 produces the convex combinations for candidate sentences 142, sentence selector 162 identifies a sentence (or set of sentences) to advance to the next iterative word generation. For example, if language model 140 produces five candidate sentences (the same base sentence ending in five newly generated words) sentence selector 162 may identify a single sentence to advance. In general score combiner 160 may use a variety of different searching or sorting methods to identify the highest scoring sentences to advance, such as beam search, B* search, best-first search, depth-first search, Dijkstra's algorithm or other searching algorithms or methods.

Generation server 130 is connected to generated response repository 134. Generated response repository 134 is a database or other data storage device used to store responses previously generated by generation server 130. Generated response repository 134 is shown as a separate entity connected to generation server 130, but in other examples, generated response repository 134 may be a storage device within generation server 130, or may be a storage device available to generation server 130 via network 110. In some examples, generated response repository 134 may be accessed by generation server 130 to retrieve previously generated responses that match an incoming request to generation server 130. For example, if generation server 130 receives a request duplicative of a previous request, generation server 130 may retrieve a response previously generated for the previous request, rather than regenerate a response for the duplicate request.

The overall operation of the components of generation server 130 is as follows: after receiving a request for a replacement sentence based on input sentence 122, language model 140 produces a plurality of candidates sentences 142 based on words of the sentence being replaced and ending in a newly generated word. Sentiment model 150 then produces sentiment scores 152 based on the closeness of the sentiment of candidate sentences 142 to requested sentiment 124. Then, score combiner 160 produces a set of convex combinations based on the probability of word appearance for each of candidate sentences 142 as well as sentiment scores 152. Then, sentence selector 162 identifies a candidate sentence to advance to the next iterative round, the selected candidate sentence acting as the base sentence for the next round of selection by language model 140. This process repeats until the candidate sentence selected by sentence selector 162 ends in an end-of-sentence token, or until the candidate sentence selected by sentence selector 162 exceeds a length threshold based on the length of input sentence 122.

When generation server 130 has finished generation of a replacement sentence, the replacement sentence may be transmitted to computing device 120 in response to the initial request. Computing device 120 (or a user of computing device 120) may then use the replacement sentence in a variety of contexts. In this example, the user of computing device 120 provides the replacement sentence to chatbot server 170. Chatbot server 170 is a computing device executing a chatbot service or program. During execution, chatbot server 170 may use the replacement sentence in order to respond to a query from an end user or a customer operating chatbot client device 172. In other examples, the user of computing device 120 may use the replacement sentence when supporting the end user or the customer directly.

Figure 2:
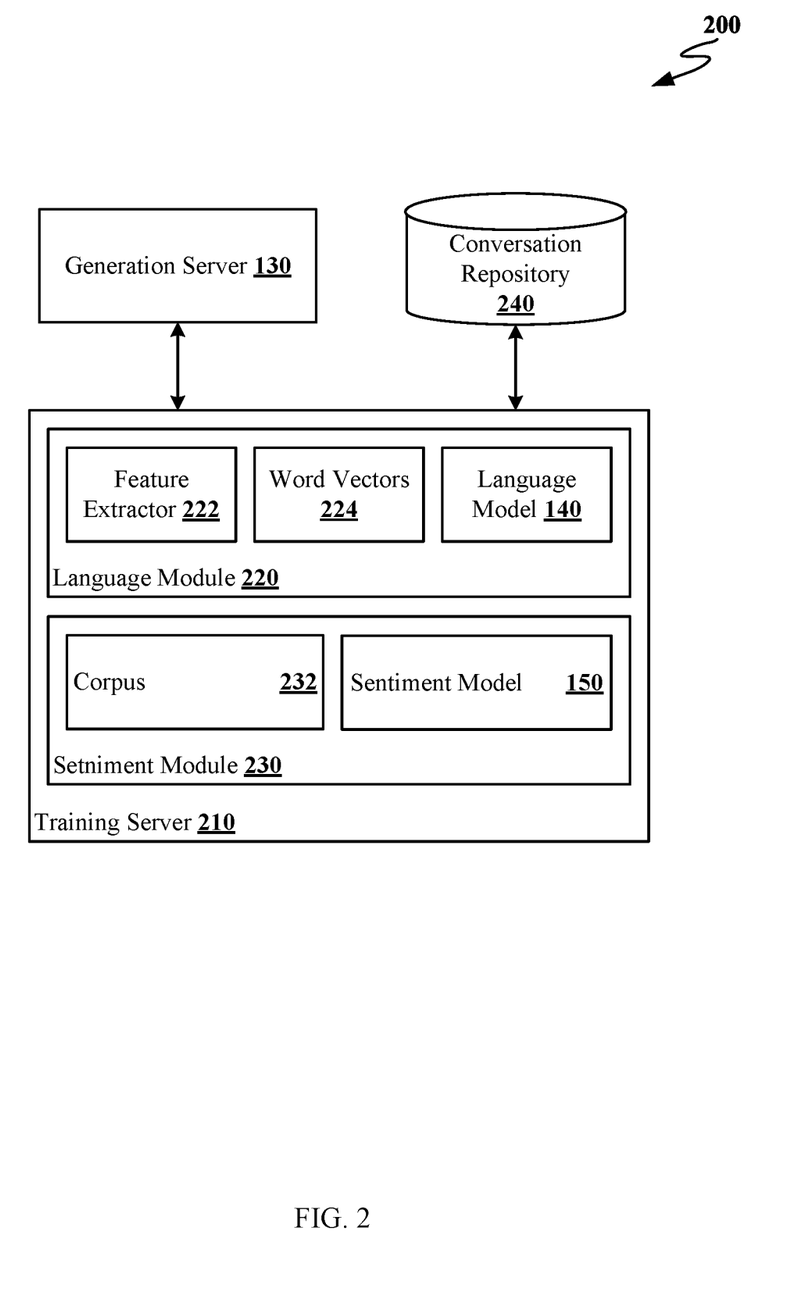
FIG. 2 depicts a computing environment for training a language model and a sentiment model, according to one embodiment.

FIG. 2 depicts a computing environment 200 for training a language model and a sentiment model, such as language model 140 and sentiment model 150, respectively. Computing environment 200 includes generation server 130, training server 210 and conversation repository 240.

Training server 210 is a computing device including at least a processor and memory (not shown). Training server 210 can be used to train language model 140, sentiment model 150 or other machine learning models. In other examples, language model 140 and sentiment model 150 may be trained on generation server 130 or another computing device. Additionally, the functions of training server 210 may be performed by multiple additional computing devices such as in a cloud computing system or other distributed computer system. Training server 210 includes two software modules, language module 220 for use in training language model 140, and sentiment module 230 for use in training sentiment model 150.

Training server 210 is connected to conversation repository 240. Conversation repository 240 is a database or other data storage device used to store data, such as text transcriptions, related to prior customer help conversations between human support agents and customers and end-users. In this example, the data of conversation repository 240 is used as a source of training data for training language model 140. Using historical conversations as training data enables language model 140 when fully trained to be adapted to a particular domain associated with the customer help conversations. In other examples, however, different sources of training data may be used, such as other databases or repositories of human language sentences. Conversation repository 240 is shown as a separate entity connected to training server 210, but in other examples, generated conversation repository 240 may be a storage device within training server 210, or may be a storage device available to training server 210 via a network connection.

Language module 220 is a software module executing on training server 210 including feature extractor 222 and language model 140 as subroutines, and word vectors 224 as stored data. Feature extractor 222 is a software routine that performs various feature extraction operations on the data of conversation repository 240 to generate word vectors 224. Feature extraction is a process to isolate meaningful aspects of raw data, and to remove irrelevant or meaningless aspects of raw data, such as punctuation or other unintelligible information. Feature extraction also includes formatting the meaningful aspects of raw data into a computer-readable format, such as, for example, numerical or vector representations of words and other document content.

Feature extraction may include various preprocessing operations on document content and text, such as removing stop words, performing tokenization, N-gram processing, performing stemming, removing non-English words, removing punctuation, replacing hypertext markup language (HTML) syntax with English grammar or removing personally identifiable information (PII) from the text.

One preprocessing operation is stemming. Stemming is the process of reducing inflected (or sometimes derived) words to their word stem, base, or root form. Stemming algorithms such as Porter's Algorithm and others may be applied during stemming. Lemmatization is a more complex approach to determining a stem of a word that involves first determining the part of speech of a word, and applying different normalization rules for each part of speech. In lemmatization, the part of speech is first detected prior to attempting to find the root since for some languages, the stemming rules change depending on a word's part of speech.

After performing preprocessing, vectors may be generated from the preprocessed content. For example, the vectors may be multi-dimensional, with values for each dimension randomly initialized. These vectors may correspond to a particular word of the preprocessed content. In general, vectors may be mapped to particular words using an embedding matrix, a matrix of all words in the system and their corresponding values (also called embeddings). By randomly initializing the dimensional values of vectors, the values can be refined during the training process, which can adapt the vectors to the particular vocabulary or domain associated with the original document content. In other cases, established vector systems, such as Global Vector for Word Representation (GloVe) or Word2vec, may be used in place of randomly initialized vector values. Both GloVe and Word2vec utilize three hundred-dimensional vector representations of words.

Word vectors 224 are set of vectors representing words from conversation repository 240. Word vectors 224 are used as input to train language model 140. Word vectors 224 may be stored as a sequence of vectors corresponding to sentences form conversation repository 240. Maintaining the sequence of sentences also maintains the context and meaning of the sentences, allowing language model 140 to take the context of individual words into account. The values of word vectors 224 may be randomly initialized, as doing so allows word vectors 224 to be refined during the process of training language model 140. When doing so, the values of word vectors 224 can be adapted to the particular domain covered by language model 140 (e.g., if language model 140 is used to generate replacement sentences for a financial services application, word vectors 224 may be specialized to reflect vocabulary of the domain of financial services). In other examples, word vectors 224 may be obtained from an external service with predefined values.

In general, training a machine learning model involves providing test input (such as a vector representing a word) to the machine learning model, with the machine learning model producing output as a result. This output is compared to a label for the test input, and the machine learning model is adjusted to produce output closer to the label. This process is repeated iteratively until the machine learning model produces sufficiently close output (according to a threshold or the opinion of an operator).

In this example, one or more vectors of word vectors 224 are provided to language model 140 as input. Different length sequences may be used to retain more context of the sequence provided. In some examples, 15 word sequences may be provided. Then, language model 140 produces a predicted next word as output. Following the example above, if a 15 word sequence is provided, language model 140 attempts to produce a $16^{th}$ word. The actual next word following the provided sequence is used as the label for the input. Thus, if the output matches the label, language model 140 has correctly predicted the next word of the sentence. By modifying parameters of language model 140 when language model 140 does not correctly predict the next word, language model 140 can be iteratively improved until language model 140 meets a threshold for accurate predictions. One potential threshold may be 95% (e.g., language model 140 correctly predicts a next word 95% of the time), although many other thresholds may be used at the discretion of the operator of training server 210.

Sentiment module 230 is software module executing on training server 210 including corpus 232 as stored data and sentiment model 150 as a subroutine. Corpus 232 is a collection of data used in training sentiment model 150. In this example corpus 232 is a large collection of sentences each labeled with a measure of sentiment. The label used may depend on the method of calculating sentiment employed. For example, if sentiment polarity is used, the labels for each sentence may be scaled from −1 to 1 or other scales as discussed above. In general, sentences of corpus 232 are provided to sentiment model 150 as input, and sentiment model 150 produces a predicted label for the sentences as output. Parameters of sentiment model 150 are iteratively modified based on the closeness of the output to the label until sentiment model 150 reaches a threshold for correct prediction. In this example sentiment model 150 is trained on training server 210, but in other examples pre-trained sentiment models may be obtained for use, or external sentiment services can be used.

In this example, training server 210 trains both language model 140 and sentiment model 150, and when fully trained, transfers language model 140 and sentiment model 150 to generation server 130 for execution, as discussed in further detail above. In other examples, different devices (including generation server 130) may be used to train language model 140 and sentiment model 150 separately, or language model 140 and sentiment model 150 may be trained by a cloud computing system or other distributed computing system.

Figure 3:
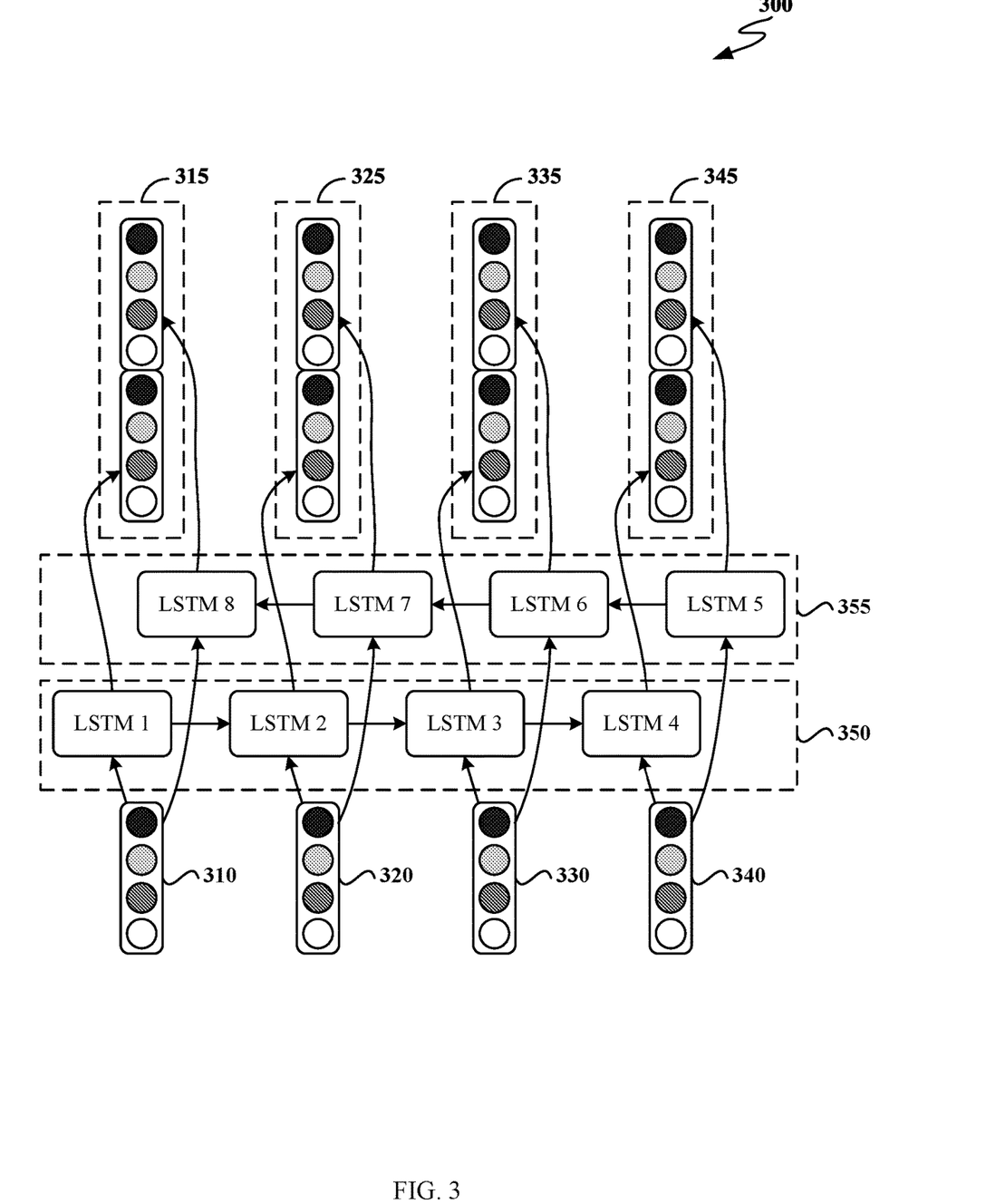
FIG. 3 is a conceptual diagram of the operation of a bidirectional long short term memory model, according to one embodiment.

FIG. 3 is a conceptual diagram 300 of the operation of a bidirectional long short term memory model (Bi-LSTM). In some examples, a language model used for generating replacement sentences (such as language model 140 of FIG. 1), may be a Bi-LSTM. Diagram 300 includes four vector representations of words, 310, 320, 330 and 340, which in this example may correspond to words of a four word sentence. Diagram 300 also includes LSTM cells 1-8 and four context analyses 315, 325, 335 and 345, each representing a predicted next word for each of the vector representations. The four context analyses have two sections, a forwards prediction (shown as the bottom of each context analysis and representing a predicted word given the forwards context of a sentence) and a backwards analysis (shown as the top of each context analysis and representing a predicted word given the backwards context of a sentence).

A Bi-LSTM consists of a number of LSTM cells, which each take one of the vector representations as input. Each LSTM cell also pushes forward its output to the next LSTM in sequence. Because the Bi-LSTM is bidirectional, it includes two series of LSTM cells, shown as 350 and 355. The Bi-LSTM model in diagram 300 includes eight individual LSTM cells, four as the forward direction (350) and four as the backward direction (355). The exact number of LSTM cells in a Bi-LSTM model is arbitrary, however.

In operation, LSTM 1 of 350 takes vector 310 as input. LSTM 1 then outputs the context analysis of vector 310 to both 315 and to LSTM 2. LSTM 2 takes the context analysis of vector 310 as well as vector 320 as input. Thus, the context analysis of vector 320 takes into account the context analysis of vector 310. LSTM 2 then outputs the context analysis of vector 320 to both LSTM 3 and 325.

This process continues for LSTM 3 and LSTM 4, so that the context analysis of vector 330 (shown as the bottom half of 335) includes the context analysis of vectors 310 and 320, and the context analysis of vector 340 includes the context analysis of vectors 310, 320 and 330. For example, if vectors 310, 320, 330 and 340 represent the words "how are you doing," the forwards context analysis at 315 is for "how," the forwards context analysis at 325 is for "how are," the forwards context analysis at 335 is for "how are you," and the forwards context analysis at 345 is for "how are you doing." Based on the forwards context analysis at 335, a predicted next word may be "today," while the more limited forwards context analysis at 315, a predicted next word may be "is." In general, the more context provided, the better quality prediction may be produced.

A similar process is performed by LSTM 5-8 for the backwards direction, resulting in both a forwards and backwards context analysis for each of the four vectors. Performing a backwards analysis may improve the context analysis for some sentence structures, for example when the last word in a sentence is a significant word contextually.

Figure 4:
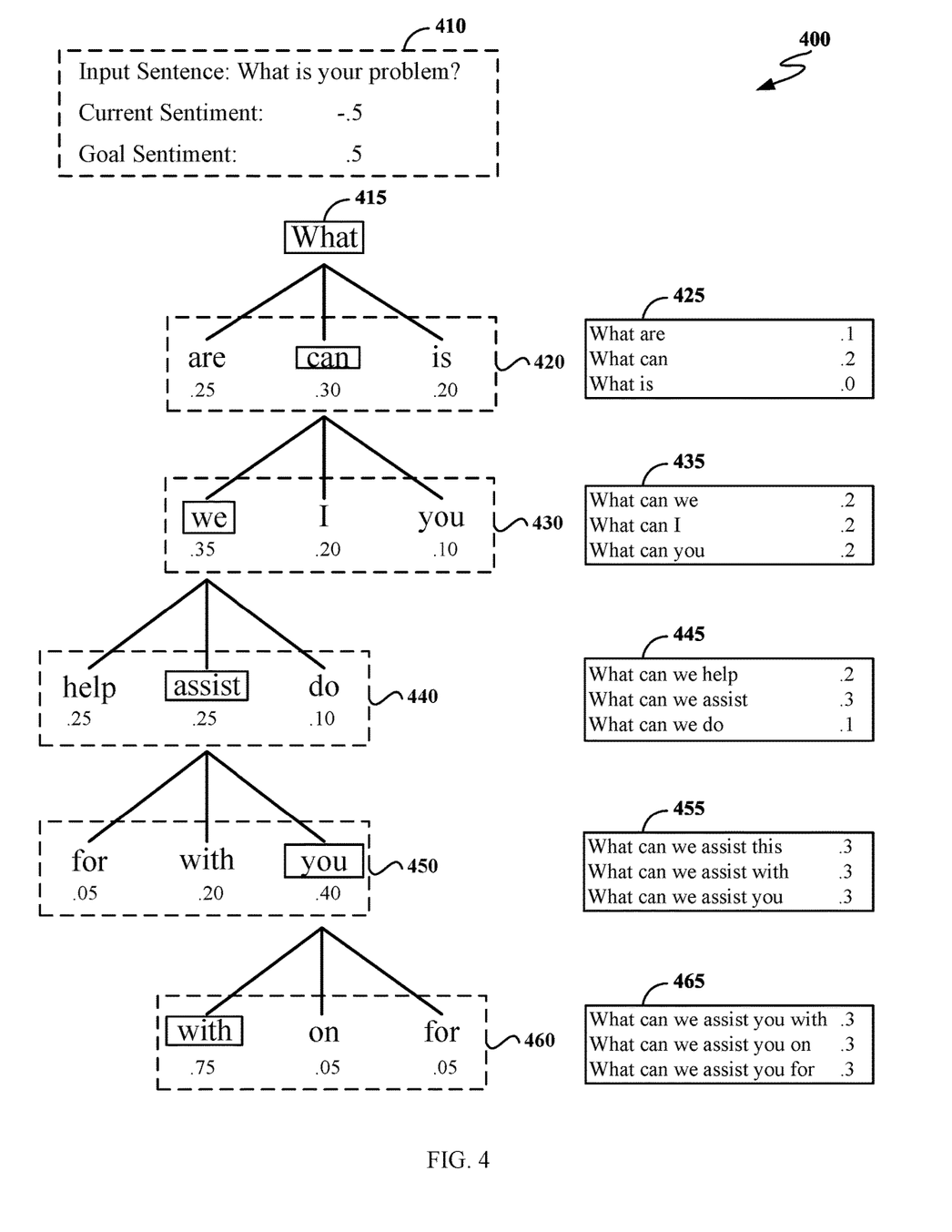
FIG. 4 is a conceptual diagram showing a method of generating a candidate sentence, according to one embodiment.

FIG. 4 is a conceptual diagram 400 showing a method of generating a candidate sentence. Diagram 400 illustrates the generation of a sentence using a tree structure, specifically with tree levels 415, 420, 430, 440, 450 and 460. Diagram 400 also includes sentence information 410, and candidate sentences 425, 435, 445, 455 and 465. In this example the probabilities of appearance and sentiment shown are merely illustrative and do not reflect actual calculations of probability or sentiment for the given contexts.

Sentence information 410 summarizes the details of a sentence generation request as discussed above. In particular, sentence information 410 includes the input sentence "What is your problem?), the current sentiment of that sentence (−.5, moderately negative) and the goal sentiment (0.5, moderately positive).

Based on the input sentence, a generation server, such as generation server 130 of FIG. 1, attempts to generate a replacement sentence. In this example, the first word of the input sentence ("what") is used as base sentence as shown at 415, although in other examples longer sequences or sentence fragments may be used as a base sentence. Here, the generation server uses a language model as described above to generate candidate sentences 425 based on the base sentence. As shown at tree level 420, one additional word has been added to the base sentence as shown to generate candidate sentences 425. Each additional word is associated with the probability of word appearance. In particular, the word "are" has a probability of word appearance of 25%, the word "can" has a probability of word appearance of 30% and the word "is" has a probability of word appearance of 20%.

Each word shown at 420 corresponds with a sentence of candidate sentences 425. Candidate sentences 425 are "What are," "What can" and "What is." After candidate sentences 425 have been generated, the generation server uses a sentiment model to analyze the sentiment of each candidate sentence. The sentiment scores for the candidate sentences is shown to the right of each candidate sentence. In particular, the sentence "What are" has a sentiment score of 0.1 (slightly positive), the sentence "What can" has a sentiment score of 0.2 and the sentence "What is" has a sentiment score of 0 (neutral).

After calculating the sentiment scores, the generation server determines a candidate sentence of candidate sentences to use as the base sentence for a next execution of the language model. In this case, the generation server selects "What can," which is associated with the highest probability of appearance (30%), and the sentiment closest to the goal sentiment (0.2 with the goal of 0.5). The word "can" being selected is illustrated by the outline around the word "can" at 420.

On a second pass, the language model uses "What can" as the base sentence, producing three words at 430. The words produced are "we," with a probability of appearance of 35%, "I," with a probability of appearance of 20% and "you," with a probability of appearance of 10%. These words correspond with candidate sentences 435 appending each produced word to the base sentence, and each have a sentiment score of 0.2. Because each candidate sentence has the same sentiment score, generation server selects the candidate sentence associated with the highest probability of appearance, "What can we."

On a third pass, the language model uses "What can we" as the base sentence, producing three words at 440. The words produced are "help," with a probability of appearance of 25%, "assist," with a probability of appearance of 25% and "do," with a probability of appearance of 10%. Unlike candidate sentences 435, each of candidate sentences 445 has a different sentiment score. Because the sentences "What can we help" and "What can we assist" are associated with the same probability of appearance, the generation server selects the candidate sentence with the highest sentiment score, "What can we assist."

On a fourth pass, the language model uses "What can we assist" as the base sentence, producing three words at 450. The words produced are "for," with a probability of appearance of 5%, "with," with a probability of appearance of 20% and "you," with a probability of appearance of 40%. Each of candidate sentences 455 has the same sentiment score, 0.3. Thus, the generation server selects the candidate sentence associated with the highest probability of appearance, "What can we assist you."

Finally, on a fifth pass, the language model uses "What can we assist you" as the base sentence, producing three words at 460. The words produced are "with," with a probability of appearance of 75%, "on," with a probability of appearance of 5% and "for," with a probability of appearance of 5%. As with candidate sentences 455, each of candidate sentences 465 has the same sentiment score, 0.3. Thus, the generation server once again selects the candidate sentence associated with the highest probability of appearance, "What can we assist you with."

As can be shown with the resulting replacement sentence "What can we assist you with," by generating the replacement sentence word-by-word, a sentence with a retained meaning to the input sentence "What is your problem?" is obtained. Further, the replacement sentence conveys a more positive sentiment than does the input sentence, and so may be more appropriate for some contexts, such as use in a customer help or customer support service.

In this example, the generation server produces 3 candidate sentences at each pass, however, in other examples the generation server may produce more or fewer candidate sentences. Additionally, rather than selecting a single candidate sentence to advance, the generation server may advance multiple candidate sentences at each pass.

Figure 5:
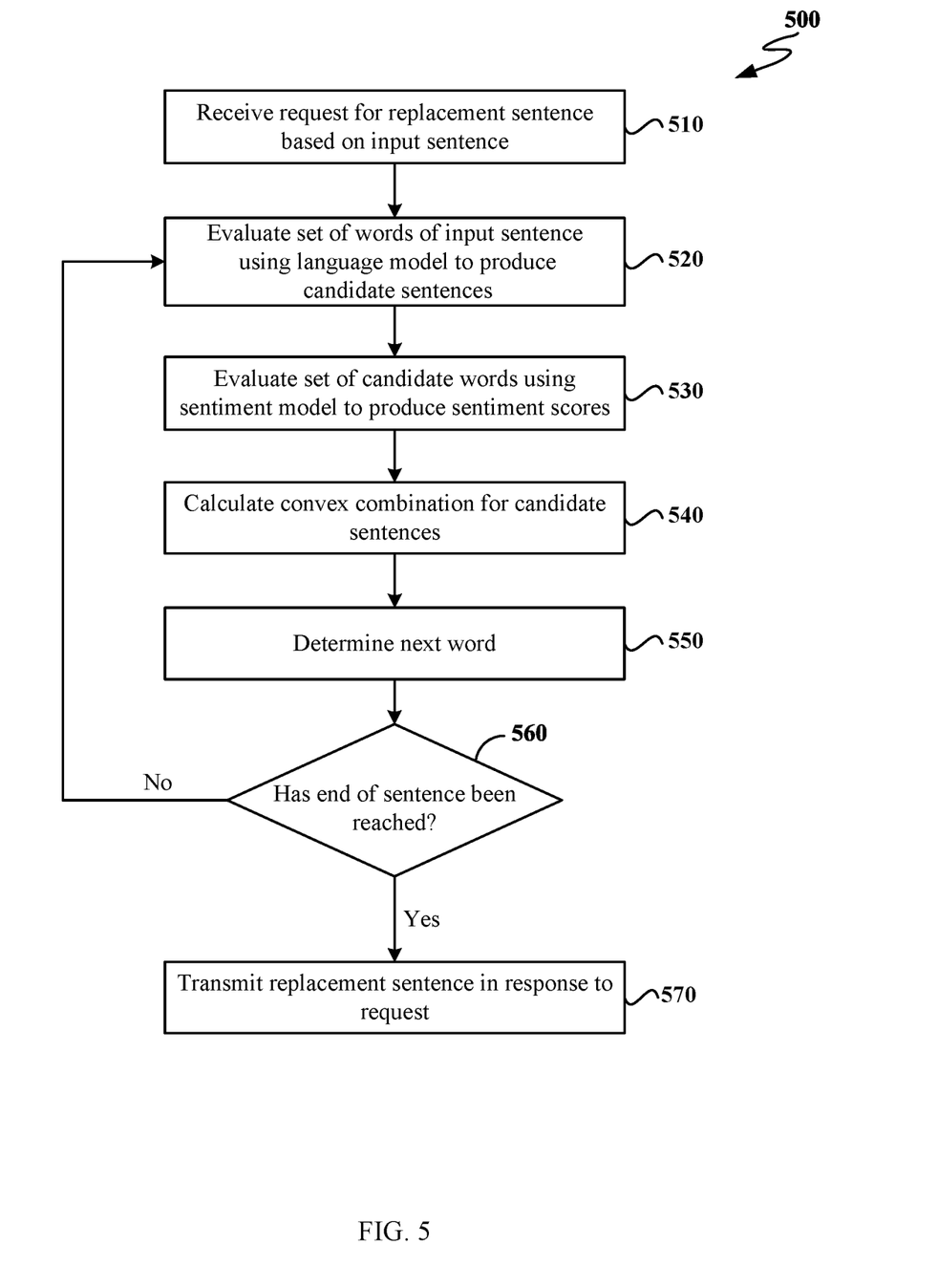
FIG. 5 is a flow chart of example operations for generating a set of candidate sentences with the same or similar meaning but a different sentiment than an input sentence.

FIG. 5 is a flow chart of example operations 500 for generating a replacement sentence with the same or similar meaning but a different sentiment than an input sentence. Operations 500 may be performed by a generation server, such as generation server 130 of FIG. 1.

Operations 500 begin at 510, where the generation server receives a request for a replacement sentence based on an input sentence. As discussed above, the request may come from a variety of sources, including a chatbot application or chatbot server, a computing device associated with a developer working on a chatbot system, or any computing device operated by a user seeking a replacement sentence generally. The generation server responds to the request by iteratively determining words of the replacement sentence word-by-word based on the input sentence.

At 520, the generation server evaluates a set of words of the input sentence using a language model configured to output candidate sentences based on a probability of word appearance following the set of words of the input sentence. The candidate sentences comprise the set of words of the input sentence appended with an ending word, the ending word being generated by the language model. In general, by outputting words based on the probability of word appearance, the language model outputs words that retain the original meaning of the input sentence, although the words may express a different sentiment.

At 530, the generation server evaluates the candidate sentences using a sentiment model configured to output sentiment scores for the candidates sentences based on a sentiment of the candidate sentences. As discussed above, the sentiment scores may reflect the polarity of sentiment of the candidate sentences. Further, the sentiment scores may be based on the difference between the actual sentiment of the candidate sentences and a goal sentiment included in the request for the replacement sentence.

At 540 the generation server calculates convex combinations for the candidate sentences using the sentiment scores for the candidate sentences and the probability of word appearance of the candidate sentences. As discussed above, convex combinations are a calculation of one or more values summing to 1, allowing the relative weight accorded to the one or more values to be adjusted. In other examples, other techniques for combining the probability of word appearance and the sentence scores may be used.

At 550 the generation server selects, based on the convex combinations, an ending word of one of the candidate sentences as the next word of the replacement sentence. In some embodiments, selecting the next word of the replacement sentence comprises identifying the ending words associated with the highest value convex combinations using a beam search algorithm. In other examples other search methods or search algorithms may be used, as discussed above.

At 560 the generation server determines if the end of the replacement sentence has been reached. For example, in some cases the generation server ends iteratively determining the next word of the replacement sentence when the next word of the replacement sentence is an end of sentence token. In other cases the generation server ends iteratively determining the next word of the replacement sentence when the replacement sentence has length exceeding a length threshold based on length of the input sentence. If the end of the replacement sentence has not been reached, operations 500 return to 520, where an additional next word is determined for the replacement sentence. If the end of the replacement sentence has been reached, operations 500 proceed to 570.

At 570, the generation server transmits the replacement sentence in response to the request for the replacement sentence. For example, the generation server may transmit the replacement sentence to a chatbot server for display to a user. In other examples the generation server may transmit the replacement sentence to a variety of other computing devices.

Some examples of operations 500 further include randomly initializing vector representations of words for use in training the language model, and during training of the language model, refining the vector representations of words based on results of the training.

Other examples of operations 500 further include receiving a second request for a second replacement sentence with a requested sentiment and an original meaning; and responding to the second request using a previously generated sentence stored in a response database, wherein the previously generated sentence has the requested sentiment and the original meaning.

In some cases, the language model is a bi-directional long short-term memory (Bi-LSTM) model trained with a set of historical conversations between human support agents and users. In such cases operations 500 may further include training the language model by providing the language model with a series of a fifteen word sequences taken from the set of historical conversations, wherein a label for each fifteen word sequence is a sixteenth word following the fifteen word sequence.

In some examples of operations 500, the sentiment model calculates the sentiment scores based on a goal sentiment provided with the input sentence, wherein the goal sentiment is different from a sentiment of the input sentence. In such examples, the probability of word appearance for a candidate sentence indicates a probability that an ending word of the candidate sentence would maintain meaning of the input sentence.

Figure 6:
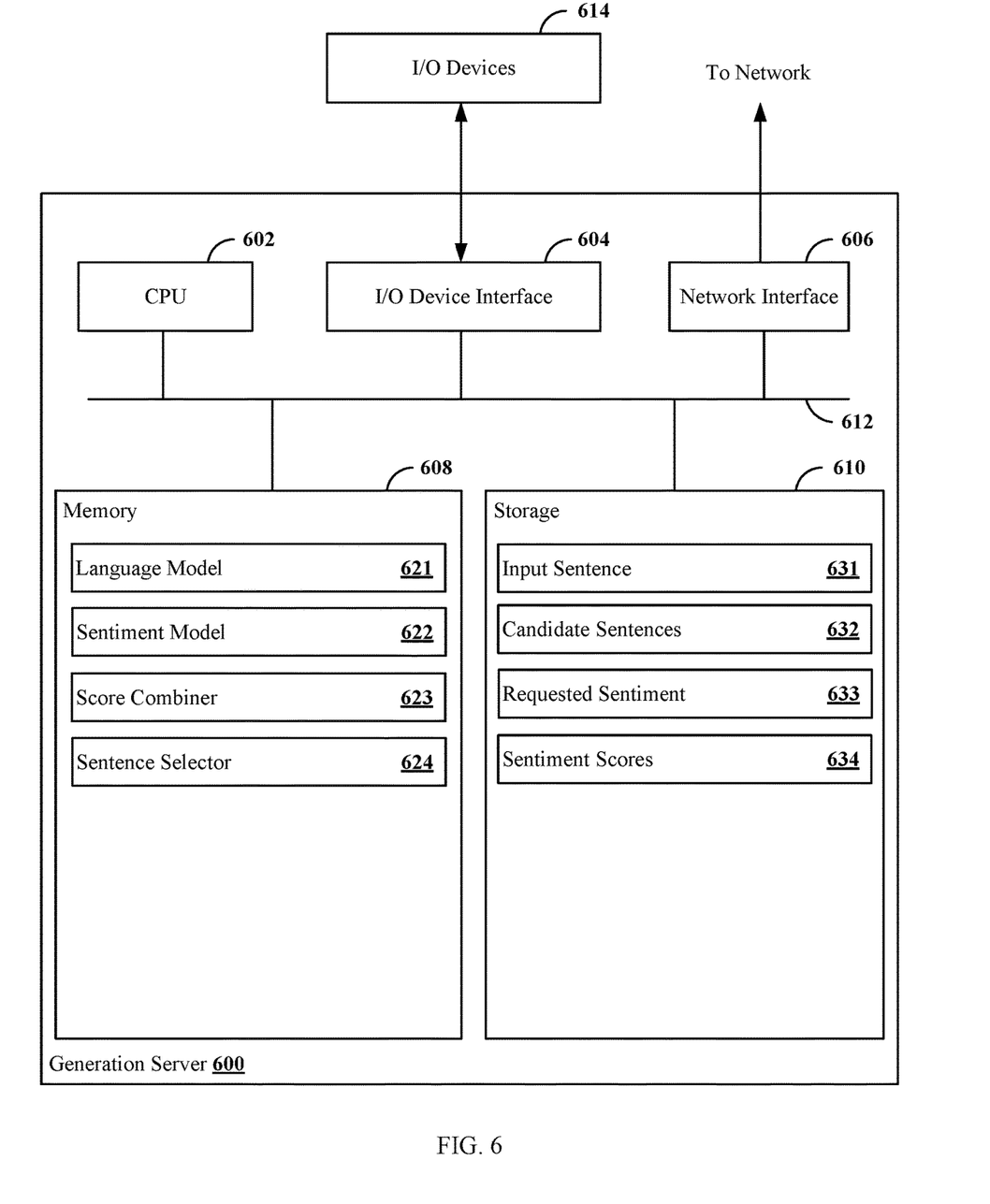
FIG. 6 is a block diagram of example generation server, according to one embodiment.

FIG. 6 is a block diagram of example generation server 600. As shown, the generation server 600 includes, without limitation, a central processing unit (CPU) 602, one or more input/output (I/O) device interfaces 604, which may allow for the connection of various I/O devices 614 (e.g., keyboards, displays, mouse devices, pen input, etc.) to generation server 600, network interface 606, memory 608, storage 610, and an interconnect 612.

The CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610. The CPU 602 is included to be representative of a single CPU, multiple CPUs, a single CPU having multiple processing cores, and the like. The I/O device interface 604 may provide an interface for capturing data from one or more input devices integrated into or connected to the generation server 600, such as keyboards, mice, touchscreens, and so on. The memory 608 may represent a random access memory (RAM), while the storage 610 may be a solid state drive, for example. Although shown as a single unit, the storage 610 may be a combination of fixed and/or removable storage devices, such as fixed drives, removable memory cards, network attached storage (NAS), or cloud-based storage.

As shown, the memory 608 includes language model 621, sentiment model 622, score combiner 623 and sentence selector 624, which are software routines executed based on instructions stored in the storage 610. Such instructions may be executed by the CPU 602.

As shown, the storage 610 includes input sentence 631, candidate sentences 632, requested sentiment 633 and sentiment scores 634. Language model 621 evaluates input sentence 631 to produce candidates sentences 632 based on a probability of word appearance. Then, sentiment model evaluates the sentiment scores of candidate sentences 632 relative to requested sentiment 633 to produce sentiment scores 634. Then, score combiner 623 combines sentiment scores 634 and the probability of word appearance for candidate sentences 632 to produce combined scores. Then, based on the combined scores, sentence selector 624 chooses a new word for use as a next word in a replacement sentence. When the replacement sentence is complete, it may be transmitted from generation server 600 to a different computing device, such as via network interface 606.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other circuit elements that are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for transforming sentiment in text, comprising:

receiving a request for a replacement sentence based on an input sentence with a given sentiment, wherein the replacement sentence has a different sentiment than the given sentiment;

receiving, based on the input sentence, a set of candidate sentences from a language model, wherein the language model is a machine learning model trained with a set of historic conversations;

determining a meaning of each respective candidate sentence of the set of candidate sentences based at least on one or more words of the respective candidate sentence;

receiving, from a sentiment model based on the set of candidate sentences, a sentiment of each candidate sentence of the set of candidate sentences;

choosing a particular candidate sentence of the set of candidate sentences based on the determined meaning of the particular candidate sentence and the received sentiment of the particular candidate sentence; and providing the particular candidate sentence in response to the request for the replacement sentence.

2. The method of claim 1, further comprising:

randomly initializing vector representations of words for use in training the language model; and during training of the language model, refining the vector representations of words based on results of the training.

3. The method of claim 1, wherein choosing the particular candidate sentence of the set of candidate sentences based on the determined meaning of the particular candidate sentence and the received sentiment of the particular candidate sentence comprises:

calculating a convex combination for each candidate sentence of the set of candidate sentences based on the sentiment of each candidate sentence of the set of candidate sentences and the meaning of each respective candidate sentence of the set of candidate sentences; and choosing the particular candidate sentence based on a highest convex combination for the particular candidate sentence.

4. The method of claim 1, further comprising:

receiving an additional request for an additional replacement sentence with the different sentiment; and providing the particular candidate sentence in response to receiving the additional request.

5. The method of claim 1, wherein the language model is a bi-directional long short-term memory (Bi-LSTM) model trained with a set of historical conversations between human support agents and users.

6. The method of claim 5, further comprising training the language model by providing the language model with a series of fifteen word sequences taken from the set of historical conversations, wherein a label for each fifteen word sequence is a sixteenth word following the fifteen word sequence.

7. The method of claim 1, wherein the sentiment model calculates the sentiment of each candidate sentence of the set of candidate sentences based on a requested sentiment, wherein the requested sentiment is:
provided to the sentiment model with the input sentence, and
is different from the given sentiment.

8. The method of claim 1, wherein:
providing the particular candidate sentence in response to the request for the replacement sentence comprises providing the particular candidate sentence to the language model; and
the method further comprises:
receiving, based on the particular candidate sentence and the input sentence, an additional set of candidate sentences, wherein:
each candidate sentence of the additional set of candidate sentences comprises the particular candidate sentence and an ending word, and
the ending word of each candidate sentence of the additional set of candidate sentences is different than each other candidate sentence in the additional set of candidate sentences;
choosing an additional candidate sentence of the additional set of candidate sentences based on a meaning of the additional candidate sentence and a sentiment of the additional candidate sentence; and
providing the additional candidate sentence to a user associated with the different sentiment.

9. The method of claim 1, wherein providing the particular candidate sentence in response to the request for the replacement sentence comprises providing the particular candidate sentence to a user associated with the request.

10. The method of claim 1, wherein:
the determined meaning of the particular candidate sentence is compared to a meaning of the input sentence to determine if the determined meaning of the particular candidate sentence meets a first threshold; and
the received sentiment of the particular candidate sentence is compared to a requested sentiment to determine if the received sentiment of the particular candidate sentence meets a second threshold; and
providing the particular candidate sentence in response to the request for the replacement sentence the determined meaning of the particular candidate sentence and the received sentiment of the particular candidate sentence comprises providing the particular candidate sentence based on whether the determined meaning of the particular candidate sentence meets the first threshold and whether the received sentiment of the particular candidate sentence meets the second threshold.

11. The method of claim 1, further comprising determining a maximum length for each candidate sentence of the set of candidate sentences based on the input sentence, wherein no candidate sentence of the set of candidate sentences exceeds the maximum length.

12. A system, comprising:
one or more processors; and
a memory storing instructions that, when executed by the one or more processors, cause the system to:
receive a request for a replacement sentence based on an input sentence with a given sentiment, wherein the replacement sentence has a different sentiment than the given sentiment;
receive, based on the input sentence, a set of candidate sentences from a language model, wherein the language model is a machine learning model trained with a set of historic conversations;
determine a meaning of each respective candidate sentence of the set of candidate sentences based at least on one or more words of the respective candidate sentence;
receive, from a sentiment model based on the set of candidate sentences, a sentiment of each candidate sentence of the set of candidate sentences;
choose a particular candidate sentence of the set of candidate sentences based on the determined meaning of the particular candidate sentence and the received sentiment of the particular candidate sentence; and
provide the particular candidate sentence in response to the request for the replacement sentence.

13. The system of claim 12, wherein the instructions, when executed by the one or more processors, further cause the system to:
randomly initialize vector representations of words for use in training the language model; and
during training of the language model, refine the vector representations of words based on results of the training.

14. The system of claim 12, wherein choosing the particular candidate sentence of the set of candidate sentences based on the determined meaning of the particular candidate sentence and the received sentiment of the particular candidate sentence comprises:
calculating a convex combination for each candidate sentence of the set of candidate sentences based on the sentiment of each candidate sentence of the set of candidate sentences and the meaning of each respective candidate sentence of the set of candidate sentences; and
choosing the particular candidate sentence based on a highest convex combination for the particular candidate sentence.

15. The system of claim 12, wherein the instructions, when executed by the one or more processors, further cause the system to:
receive an additional request for an additional replacement sentence with the different sentiment; and
provide the particular candidate sentence in response to receiving the additional request.

16. The system of claim 12, wherein the language model is a bi-directional long short-term memory (Bi-LSTM) model trained with a set of historical conversations between human support agents and users.

17. The system of claim 16, wherein the instructions, when executed by the one or more processors, further cause the system to train the language model by providing the language model with a series of fifteen word sequences taken from the set of historical conversations, wherein a label for each fifteen word sequence is a sixteenth word following the fifteen word sequence.

18. The system of claim 12, wherein the sentiment model calculates the sentiment of each candidate sentence of the set of candidate sentences based on a requested sentiment, wherein the requested sentiment is:
provided to the sentiment model with the input sentence, and
is different from the given sentiment.

19. The system of claim 12, wherein:
providing the particular candidate sentence in response to the request for the replacement sentence comprises providing the particular candidate sentence to the language model; and
the instructions, when executed by the one or more processors, further cause the system to:
receive, based on the particular candidate sentence and the input sentence, an additional set of candidate sentences, wherein:
each candidate sentence of the additional set of candidate sentences comprises the particular candidate sentence and an ending word, and
the ending word of each candidate sentence of the additional set of candidate sentences is different than each other candidate sentence in the additional set of candidate sentences;
choose an additional candidate sentence of the additional set of candidate sentences based on a meaning of the additional candidate sentence and a sentiment of the additional candidate sentence; and
provide the additional candidate sentence to a user associated with the different sentiment.

20. A method for transforming sentiment in text, comprising:
receiving a request for a replacement sentence based on an input sentence with a given sentiment, wherein the replacement sentence has a different sentiment than the given sentiment;
receiving, based on the input sentence, a set of candidate sentences from a language model, wherein the language model is a machine learning model trained with a set of historic conversations;
receiving, from a sentiment model based on the set of candidate sentences, a sentiment of each candidate sentence of the set of candidate sentences;
determine a semantic drift between the input sentence and each respective candidate sentence of the set of candidate sentences based on comparing a vector distance between words of the input sentence and words of each respective candidate sentence;
choosing a particular candidate sentence of the set of candidate sentences based on the determined semantic drift of the particular candidate sentence and a received sentiment of the particular candidate sentence;
comparing the determined semantic drift of the particular candidate sentence to a threshold; and
providing the particular candidate sentence in response to the request for the replacement sentence based on comparing the determined semantic drift of the particular candidate sentence to the threshold.

\* \* \* \* \*